United States Patent [19] [11] 3,739,277
Schneider et al. [45] June 12, 1973

[54] DIGITAL DATA TRANSMISSION SYSTEM UTILIZING PHASE SHIFT KEYING

[75] Inventors: Robert J. Schneider, Mount Prospect; William I. Levy, Wheeling; both of Ill.

[73] Assignee: The Hallicrafters Co., Rolling Meadows, Ill.

[22] Filed: June 2, 1969

[21] Appl. No.: 829,567

[52] U.S. Cl. ................. 325/30, 178/66 A, 325/45, 325/163, 325/320

[51] Int. Cl. ............................................ H04l 27/18

[58] Field of Search ...................... 325/30, 45, 134, 325/145, 163, 320, 369, 184; 329/137, 112, 50, 122, 123; 179/15 BA, 15 BM, 15 FS, 15 FD; 331/19, 37, 38; 178/66 A, 66 R, 88

[56] References Cited

UNITED STATES PATENTS

| | | | |
|---|---|---|---|
| 2,778,933 | 1/1957 | Crist | 329/50 |
| 3,379,992 | 4/1968 | Hoo | 331/19 |
| 3,553,368 | 1/1971 | Rudolph | 325/30 |
| 3,412,206 | 11/1968 | Bizet et al. | 325/320 |
| 3,349,181 | 10/1967 | Ito | 325/320 |
| 3,447,085 | 5/1969 | Haas et al. | 325/320 |
| 3,294,907 | 12/1966 | Heald | 325/320 |

*Primary Examiner*—John W. Caldwell
*Assistant Examiner*—Marshall M. Curtis
*Attorney*—Hofgren, Wegner, Allen, Stellman & McCord

[57] ABSTRACT

A digital data transmission system utilizing differential phase shift keying. In the transmitter serial data bits are grouped and the carrier wave is phase shifted by an angle determined from a comparison of successive data groups. In the receiver the successive phase shifts are detected by comparing the received signal in digital form with a digital reference, at a plurality of points in each cycle. When several matches are obtained for one phase, that phase is accepted as the phase of the received signal. The difference between the phases of successive portions of the received signal is utilized to reconstitute the transmitted data. Changes in polarity of the received signal are compared with the local reference signal to generate a control for the reference.

20 Claims, 13 Drawing Figures

INVENTORS.
Robert J. Schneider
William I. Levy
BY Hofgren, Wegner, Allen, Stellman & McCord
ATTORNEYS

PATENTED JUN 12 1973

3,739,277

SHEET 3 OF 9

| W1 | W2 | W3 | $B_M$ | $B_L$ | $B_P$ |
|---|---|---|---|---|---|
| 0 | 0 | 0 | 0 | 0 | 0 |
| 1 | 0 | 0 | 0 | 1 | 0 |
| 1 | 1 | 0 | 1 | 0 | 0 |
| 1 | 1 | 1 | 1 | 1 | 0 |
| 1 | 1 | 1 | 1 | 1 | 0 |
| 1 | 1 | 0 | 1 | 0 | 0 |
| 1 | 0 | 0 | 0 | 1 | 0 |
| 0 | 0 | 0 | 0 | 0 | 0 |
| 0 | 0 | 0 | 0 | 0 | 1 |
| 1 | 0 | 0 | 0 | 1 | 1 |
| 1 | 1 | 0 | 1 | 0 | 1 |
| 1 | 1 | 1 | 1 | 1 | 1 |
| 1 | 1 | 1 | 1 | 1 | 1 |
| 1 | 1 | 0 | 1 | 0 | 1 |
| 1 | 0 | 0 | 0 | 1 | 1 |
| 0 | 0 | 0 | 0 | 0 | 1 |

PATENTED JUN 12 1973 3,739,277

DIGITAL DATA TRANSMISSION SYSTEM UTILIZING PHASE SHIFT KEYING

In a digital data transmission system three interrelated factors are the principal considerations in determining the relative system utility. They are the rate of data transmission, the bandwidth required for the signal transmission channel and the accuracy with which the received signal can be demodulated.

The system disclosed herein utilizes differentially coherent phase shift keying in which groups of digits representing the information to be transmitted control the phase shift modulation of a carrier. Several cycles of the carrier are transmitted and the phase is shifted for the next group of digits. The modulated carrier is transmitted to the receiver as over a telephone line or the like. The quality of the transmission link places some limits on the carrier frequency and data rate which may be achieved. However, as an example, a transmission rate of 2,400 data bits per second can be achieved with a standard or "dial-up" telephone line.

In the receiver the phase modulated carrier is converted to a series of digital signals which are compared with reference signals representing the various possible phases. For each three cycle segment of the carrier (which represents three digits of information), a multiplicity of matches is possible. The receiver counts the matches and determines the phase of the received signal on the basis of the occurrence of plural matches. This demodulator greatly reduces errors in the received data.

The system has circuits in which digital data groups are combined. Whether the combination is an addition or a subtraction depends on the sign of the data and the nature of the combination. The term "summation" will be used to denote either.

One feature of the invention is the apparatus and method for modulation of the carrier. Serial digital data is divided into multi-digit groups and each group controls the phase of several cycles of transmitted signal. More particularly, a carrier source provides signals at each of a plurality of phases. Successive three bit digital data groups are summed and the sum is utilized to select the carrier phase to be transmitted. After a three cycle carrier segment has been transmitted, another carrier phase is selected for transmission, as determined by the sum of the next group of data digits with the digits which determined the preceding phase.

In the receiver, a principal feature is the detector in which a cycle of the received signal is divided into several portions and the phase of the received signal is determined by comparing each portion with references representing the possible phases. The matches for each phase are added and when a predetermined total of matches for one phase is reached, that phase is selected as representing the received signal. The difference between successive received signal phases represents the modulating data information.

Another feature is that the detector of the receiver includes an output network in which the selected phase signal is converted to a digital representation and successive digital representations of the received signal phase are summed to represent in digital form the difference between successive phases. This corresponds with the modulating data at the transmitter.

A further feature is the provision in the receiver of an analog to digital converter including means responsive to the polarity of the received signal for generating a digital signal representing polarity and means responsive to the instantaneous amplitude of the received signal for generating a digital signal representing amplitude.

Yet another feature is the provision of timing control signals for digital circuits of the receiver. As the phase of the received signal changes between signal segments, the time relation of some of the timing signals must be modified. Accordingly, the timing circuits include means for detecting the phase of occurrence of the phase changes of the received signal and means responsive to such detecting means for shifting the phase of the timing signal to coincide with the transmitted modulation rate of the received signal. More particularly, the timing circuits include a source of a square wave reference signal at a harmonic of the timing signals, means responsive to the phase comparator for adding or subtracting pulses to the square wave to bring it into synchronism with the transmitted modulation rate of the received signal, and a frequency divider responsive to the square wave to provide timing signals.

Still a further feature of the invention is the provision of an automatic frequency control in which changes in polarity of the received signal are compared with a reference signal at a harmonic thereof, together with means responsive to such phase comparison providing a control signal to the local oscillator of the receiver. More particularly, the received signal may have $n$ discrete phases and the frequency control utilizes a comparison between the polarity changes of the received signal and a reference signal having a frequency which is $2n$ times the frequency of the received signal.

Further features and advantages of the invention will readily be apparent from the following specification and from the drawings, in which.

The system of this invention utilizes phase shift modulation of a carrier wave and more particularly, utilizes a technique known as differentially coherent phase shift keying (sometimes simply differential phase shift keying). In the embodiment illustrated in the application, serial digital data is divided into groups of three digits each (eight possible binary combinations). The digital group is summed with (e.g., added to) the preceding digital group and a digital word representing a difference between them determines the selection of the carrier phase for transmission. Three cycles of the selected phase are transmitted. Then the next group of data is summed and another phase of the carrier selected for transmission.

Figure 1:
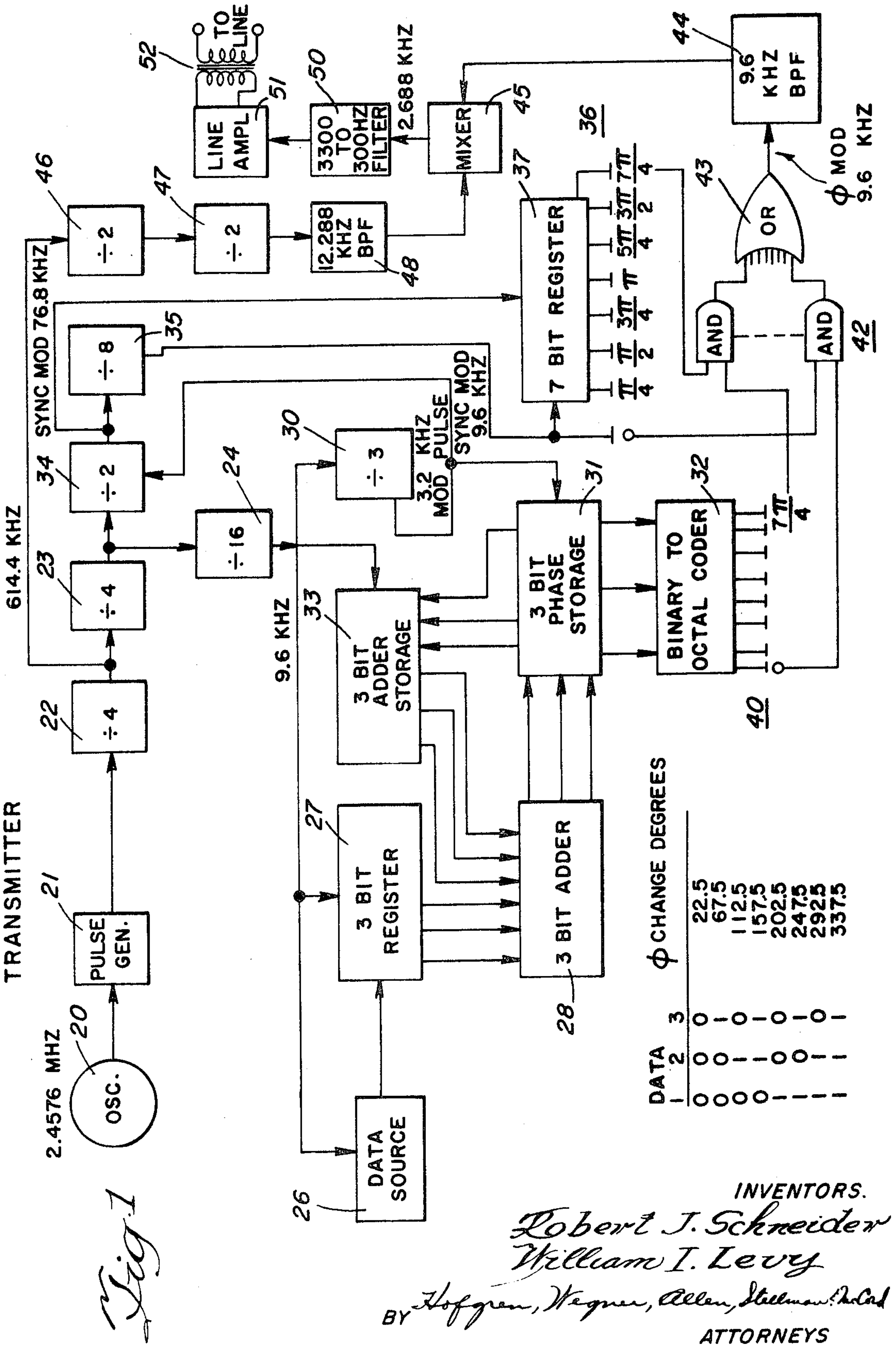
FIG. 1 is a block diagram of a transmitter for developing and transmitting the phase shifted signal.

Referring now to FIG. 1, an oscillator 20 having an operating frequency of 2.4576 MHz (megahertz) provides the basic frequency and timing reference for the system. The output of oscillator 20 is connected with a pulse generator 21 which converts the sine wave of the oscillator to a square wave. A ÷4 circuit 22 has an output of 614.4 KHz (kilohertz), one portion of which is connected with the second ÷4 circuit 23, the output of which has a frequency of 153.6 KHz. One output of divider 23 is connected through a ÷16 circuit 24 which has an output at 9.6 KHz, providing timing for the data input circuitry.

Data source 26 delivers serial digital data to a 3 bit data register 27, both the data source and the data register being timed by the 9.6 KHz signal. Three data bits are stored in register 27 at the rate of 3.2 KHz. These 3 bit data groups or words are connected in parallel with a 3 bit adder circuit 28. A ÷3 circuit 30 operated from divider 24 has a 3.2 KHz modulation control pulse output. The output of adder 28 is connected with a 3 bit phase storage register 31 which is timed by the 3.2 KHz signal. Data in the phase storage register is connected with a binary-to-octal coder 32, to control the selection of the carrier phase for transmission, as will appear.

The information in storage register 31 is transferred to an adder storage register 33 under the control of the 9.6 KHz signal. The data in adder storage is summed by adder 28 with that in 3 bit register 27 to provide the signal into phase storage register 31. Thus, the signal in the phase storage register 31 represents a 3 bit digital difference between successive digital data groups.

As the adder storage register 33 is timed by the 9.6 KHz signal while the 3 bit phase storage register is timed by the 3.2 KHz signal, data is always transferred from the phase storage register to the adder storage register before being entered in the phase storage register from the adder. This prevents loss of a digital word in the addition procedure.

Another output from ÷4 circuit 23 is connected with a synchronized ÷2 circuit 34, controlled by the output of divider 30 for synchronism with entry of a digital word into phase storage register 31. The output of divider 34, 76.8 KHz, is divided by 8 at 35 to provide a synchronized modulating signal at 9.6 KHz. The synchronized 9.6 KHz signal is shifted by the dividers on the occurrence of each 3.2 KHz modulation pulse to have an inherent phase offset from the preceding signal of 22.5°. This corresponds in time with the transfer of a 3 bit digital signal from phase storage 31 to coder 32.

The synchronized modulating signal at 9.6 KHz is utilized to provide 8 signals at phases separated by ($\pi/4$) radians (45°). The 9.6 KHz synchronized modulating signal (with the inherent 22.5° offset from the signal during the preceding data group) is connected directly with a zero phase terminal 36-0 and with the input of a 7 bit shift register 37. A synchronized signal at 76.8 KHz is obtained from the output of divider 34 and serves to time the operation of register 37. As this timing signal is the harmonic of the synchronized demodulating signal, the various sections of the register provide 8 signals with a ($\pi/4$) phase separation at terminals 36-($\pi/4$)...36-($7\pi/4$). The next 3.2 KHz modulating pulse from divider 30 shifts the signals from register 37 through a phase angle of 22.5°. Thus there are 16 possible signal phases.

The binary-to-octal coder 32 has an output at one of the terminals 40-0...40-($7\pi/4$) which represents the digital signal in phase storage register 31. Eight two-input AND gates 42 (only two are shown) each have their input terminals connected with corresponding outputs of binary-to-octal coder 32 and the various phases of the synchronous modulating signal. The AND gate 42 corresponding with the output of coder 32 is turned on for a period of three cycles of the 9.6 KHz synchronized modulating signal (one cycle of the 3.2 KHz modulating pulse), permitting 3 cycles of the appropriate phase of the signal to pass. This selected phase signal is coupled through OR gate 43 and bandpass filter 44 to a mixer 45. In the mixer the selected phase signal is combined with a 12.288 KHz signal derived from the output of divider 22 (614.4 KHz) through ÷25 circuit 46 and ÷2 circuit 47 and bandpass filter 48. The lower side band product of mixer 45 is selected (2.688 KHz) and coupled through a filter 50 having a pass band of 300 Hz to 3,300 Hz, to line amplifier 51. The 2.688 KHz signal which is transmitted to the receiver has phase modulation corresponding with that of the selected 9.6 KHz signal. The output of line amplifier 51 is connected through transformer 52 with the transmission line (not shown), and thus to the receiver.

The chart at the lower left corner of FIG. 1 shows the correlation between the 3 bit words (groups) of digital data and the phase change in degrees of the 9.6 KHz synchronized modulating signal from the signal for the preceding data word.

Using the transmitter and modulation methods described, digital data can be transmitted at the rate of 9,600 bits per second over a transmission channel of 3 KHz bandwidth. Special lines available from the Bell System have this capability.

Standard telephone lines, such as those over which the usual voice communication is conducted, have a much narrower bandpass, as of the order of 750 Hz. Here, utilizing the invention, but with lower frequencies and data rates, information may be transmitted at a rate of the order of 2,400 bits per second. Such telephone lines are commonly referred to as dial-up lines as they are normally obtained by merely dialing a number on the telephone. Present dial-up communications are limited to data rates of the order of 300 to 600 bits per second.

In the receiver, a novel demodulator provides a high degree of immunity to noise and other interference and thus minimizes errors in the received data.

Figure 2:
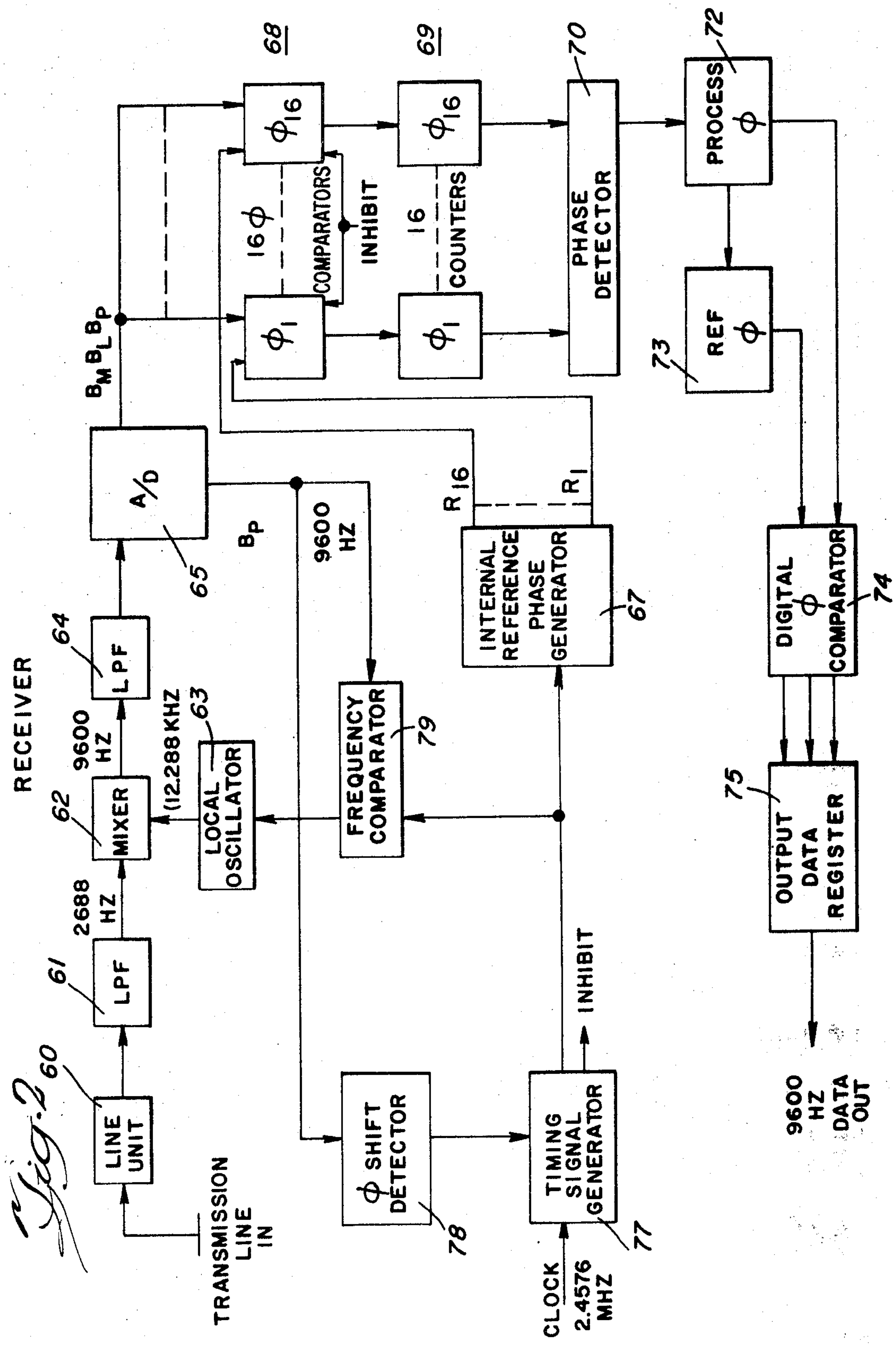
FIG. 2 is a block diagram of a receiver illustrating various aspects of the invention.

Turning now to FIG. 2, the transmission line from the transmitter is connected through an impedance matching line unit 60 and a low pass filter 61 with a mixer 62. Here the incoming signal (phase shifted 2,688 Hz) is combined with the output of a local oscillator 63 (nominally 12.288 KHz) and an output is derived from the mixer at 9,600 Hz. This is a phase modulated signal (three cycle segments with the phase shift between successive segments representing the difference between successive data groups) corresponding with the signal at the output of OR gate 43 of the transmitter. The phase modulated signal is connected through low pass filter 64, which eliminates the local oscillator frequency, with the input of an analog-to-digital (A/D) converter 65.

In the analog-to-digital converter the phase modulated 3 cycle segments of the 9,600 Hz sine wave signal are analyzed for both polarity and amplitude. Sixteen samples are taken of each cycle of the 9,600 Hz signal to provide 16 serial digital words each having 3 bits, $B_M$, $B_L$ and $B_P$, indicating respectively the most significant and least significant amplitude levels and the polarity. The digital representations of the first cycle of received signal are ignored to reduce transient errors. The digital representations of the second and third cycles are compared with reference signals in a detector and the modulating data is regenerated.

The detector has 16 channels, corresponding with the 16 possible phase conditions of the received signal. The signal segment representing each group of 3 bits of transmitted information has eight possible phase conditions separated by 45°. The phases of each successive 3 cycle segment of the transmitted signal are offset by 22.5°. This provides a second set of eight phases, a total of 16.

An internal reference phase generator 67 (IRPG) provides 16 sets of amplitude and polarity bits ($R_1$...$R_{16}$) defining each of the possible phase conditions of the received signal. The detector includes 16 channels (two —$\phi_1$ and $\phi_{16}$— are shown in FIG. 2), each channel having a phase comparator 68 to which the output of A/D converter 65 is connected along together with the digital representation of one phase from the internal reference phase generator 67. A match should be found between the digital word representing the instantaneous phase of the received signal and one of the reference phases. This match will cause one of the 16 counters 69 connected with the 16 phase comparators to register a "match". As the number of matches builds up on counters 69, a phase detector circuit 70 determines which phase is represented by the received signal.

As will appear below, the operation of the detector circuit is inhibited during the first cycle of the three cycle transmitted signal when the phase is shifted, resulting in a transient phase condition. The comparators 68 of the detector operate for the second and third cycles of the three cycles of the transmitted wave, providing a maximum of 32 possible signal elements during which matches may occur. Phase detector 70 may, for example, be set to respond to some desired count, as 17 matches, for example, to determine the phase of the received signal segment being processed. When this count is reached, a digital signal is generated representing the phase of the received signal segment, and is coupled to process phase register 72. The difference between the phase of the signal segment being processed and the previous signal segment phase (stored in reference phase register 73) is determined by digital phase comparator 74. A signal representing the modulating digital data is coupled from phase comparator 74 to output data register 75.

The digital circuits of the receiver require a variety of timing or control signals for their proper operation. A timing reference signal, as a square wave from a clock at 2.4576 MHz, is provided either internally of the receiver or by connection with a transmitter, in the case of a system with both a transmitter and receiver at each terminal. The clock signal is connected with a timing signal generator 77 which includes a series of dividers that provide square wave signals at various frequencies which are integral subharmonics of the 2.4576 MHz clock. Timing signals other than square waves are also generated, as will appear.

In order to maintain the proper phase relation between some of the signals generated in timing network 77 and the received signal, the polarity bit $B_P$ from the A/D converter 65 is connected with a phase shift detector 78. The occurrence of a change in phase of the received signal at the start of a three cycle signal segment (as indicated by a change in sign of the polarity bit) is utilized to control the phase of some of the timing signals.

The local oscillator 63 must operate at precisely the correct frequency to insure proper determination of phase in the detector. The polarity bit $B_P$ (9,600 Hz) is connected with frequency comparator 79, where it is compared with a 153.6 KHz signal from the timing signal generator 77. If the frequency of the local oscillator drifts and the polarity bits $B_P$ do not occur at the proper time, a control signal is developed which is connected with the oscillator to correct its frequency.

Some of the circuits of the receiver will now be considered in detail.

Figures 3, 4, 5:
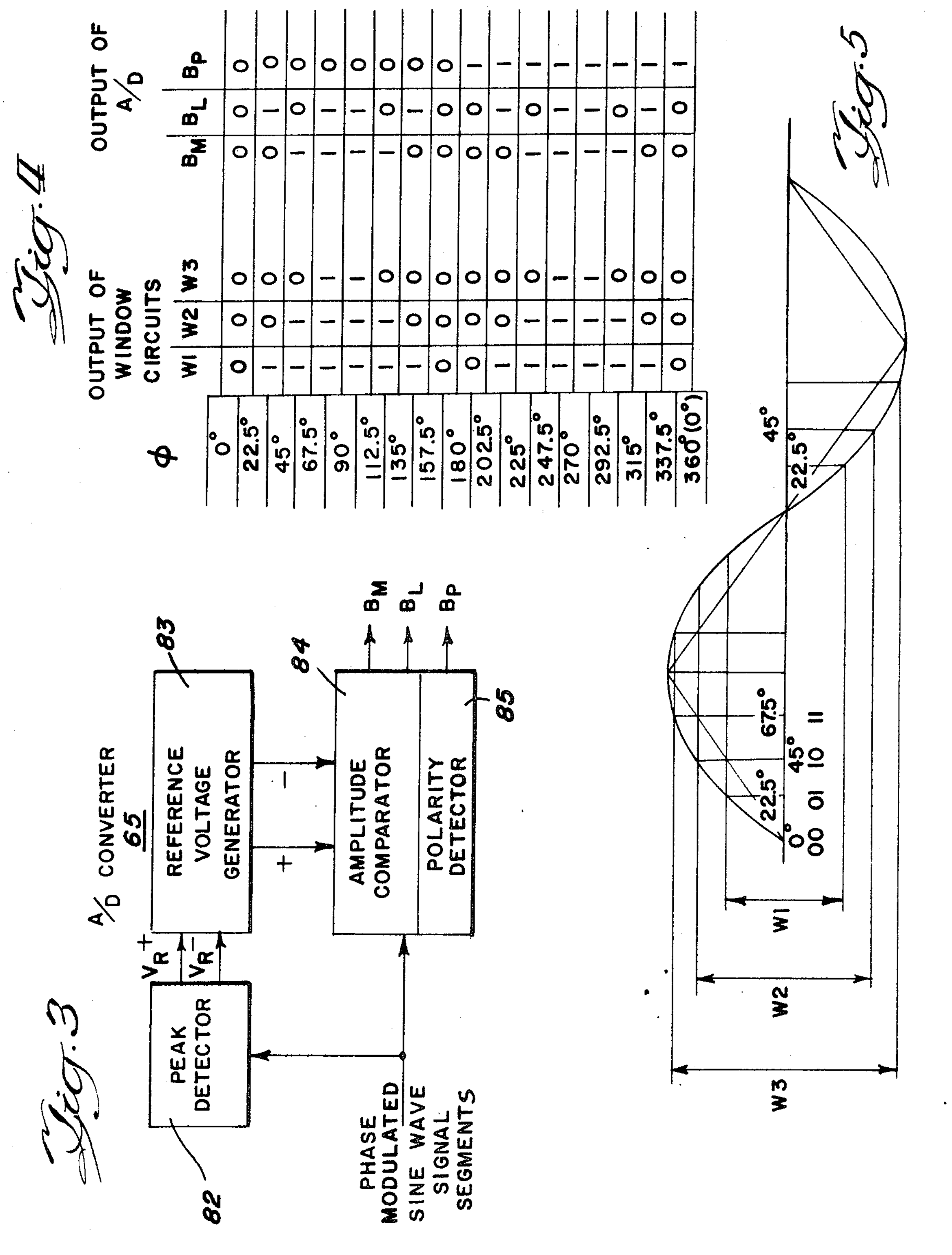
FIG. 3 is a block diagram of the analog-to-digital (A/D) converter.
FIG. 4 is a chart utilized in explaining the operation of the analog-to-digital converter.
FIG. 5 is a waveform utilized in explaining the operation of the analog-to-digital converter.

In FIG. 3 the A/D converter 65 is illustrated in a simplified block form. The phase modulated sine wave signal segments are connected with a peak detector 82 which detects the amplitude of both the positive and negative peaks, developing voltages $V_R+$ and $V_R-$ which are coupled with reference voltage generator 83. Positive and negative reference voltages (+) and (−) are connected with an amplitude comparator 84 in which the instantaneous amplitude of the incoming sine wave is compared with the references to develop the 2 digital amplitude bits $B_M$ and $B_L$. Polarity detector 85 has an output $B_P$ which is either 1 or 0 depending on the instantaneous polarity of the sine wave. The digital representation of a cycle of sine wave signal is shown in the right hand portion of the chart of FIG. 4. The digital designations apply to the segment of the sine wave between the phase angles in the first column. Thus, during that portion of the sine wave from 0° to 22.5°, the digital representation of the wave is 000. From 22.5° to 45° the digital representation is 010. The other relationships will be evident from an inspection of FIG. 4.

Figure 6:
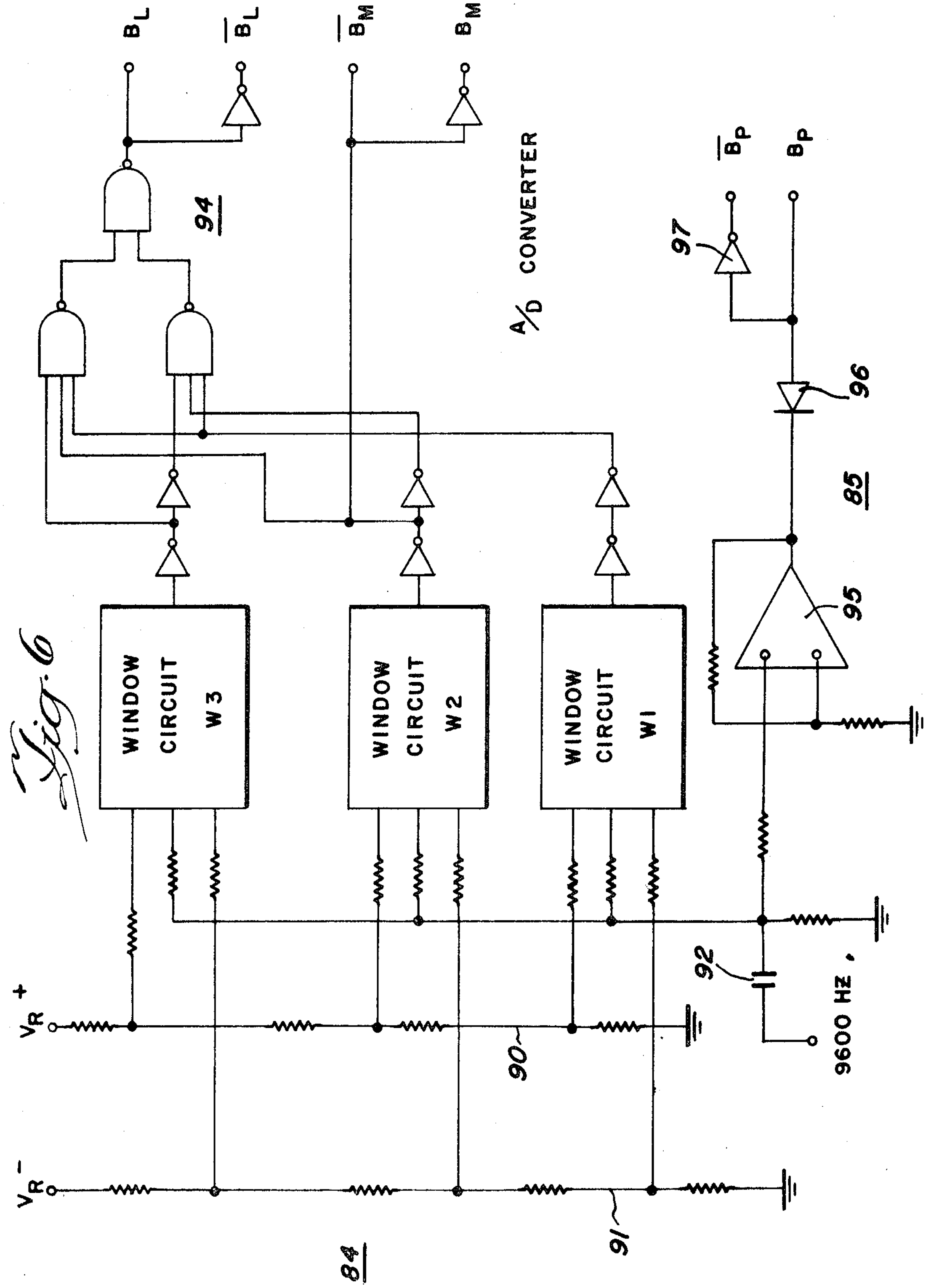
FIG. 6 is a block diagram of the reference voltage generator and a comparator circuit in the analog-to-digital converter.

The amplitude comparator 84 and polarity detector 85 are shown in more detail in FIG. 6. Amplitude comparator 84 utilizes three window detector circuits, W1, W2 and W3. Each window detector circuit is provided with positive and negative voltage references based on the outputs of peak detector 82, scaled by voltage dividers 90, 91 in the reference voltage generator. In addition, the 9,600 Hz signal is coupled through capacitor 92 and isolating resistors to each of the window detector circuits. The outputs of the three detector window circuits indicate whether the instantaneous amplitude of the received sine wave is above or below certain levels relative to the peak amplitude of the signal. The relationship is illustrated graphically in FIG. 5. Here, the amplitude of detection for window detector circuit W1 is seen to be that associated with a phase angle of 22.5°.

The amplitude for window detector circuit W2 is that of 45° and for circuit W3 is that of 67.5°. More specifically, window detector circuit W1 has a zero output for signal amplitudes less than those indicated by the arrow W1, FIG. 5, representing a phase angle within 22.5° on either side of the zero line. This is equivalent to 0.382 times the peak voltage of the sine wave. For signal amplitudes greater than arrow W1, window detector circuit W1 has a 1 output. Similarly, window detector circuit W2 has a 0 output for voltages less than that indicated by the arrow W2, FIG. 5 (0.707 times the peak voltage; a phase angle of 45°) and a 1 output for greater voltages. The limits for window detector circuit W3 correspond with the arrow W3 (0.924 times the peak voltage-67.5°). Logic network 94 connected with the outputs of the three window detector circuits develops the digital amplitude bits $B_L$, $\overline{B_L}$, $B_M$, $\overline{B_M}$ in accordance with the relationship charted in FIG. 4.

The phase modulated 9,600 Hz sine wave is also connected with the input of amplifier 95 which amplifies, limits and inverts. When the input is positive, the output is negative. Diode 96 conducts and the $B_P$ output terminal is essentially at 0 potential. A $\overline{B_P}$ output is obtained through inverter 97. During the second half cycle, the input to amplifier 95 is negative, the output is positive and diode 96 does not conduct. In this condition, $B_P$ is 1 and $\overline{B_P}$ is 0.

Figures 7, 10:
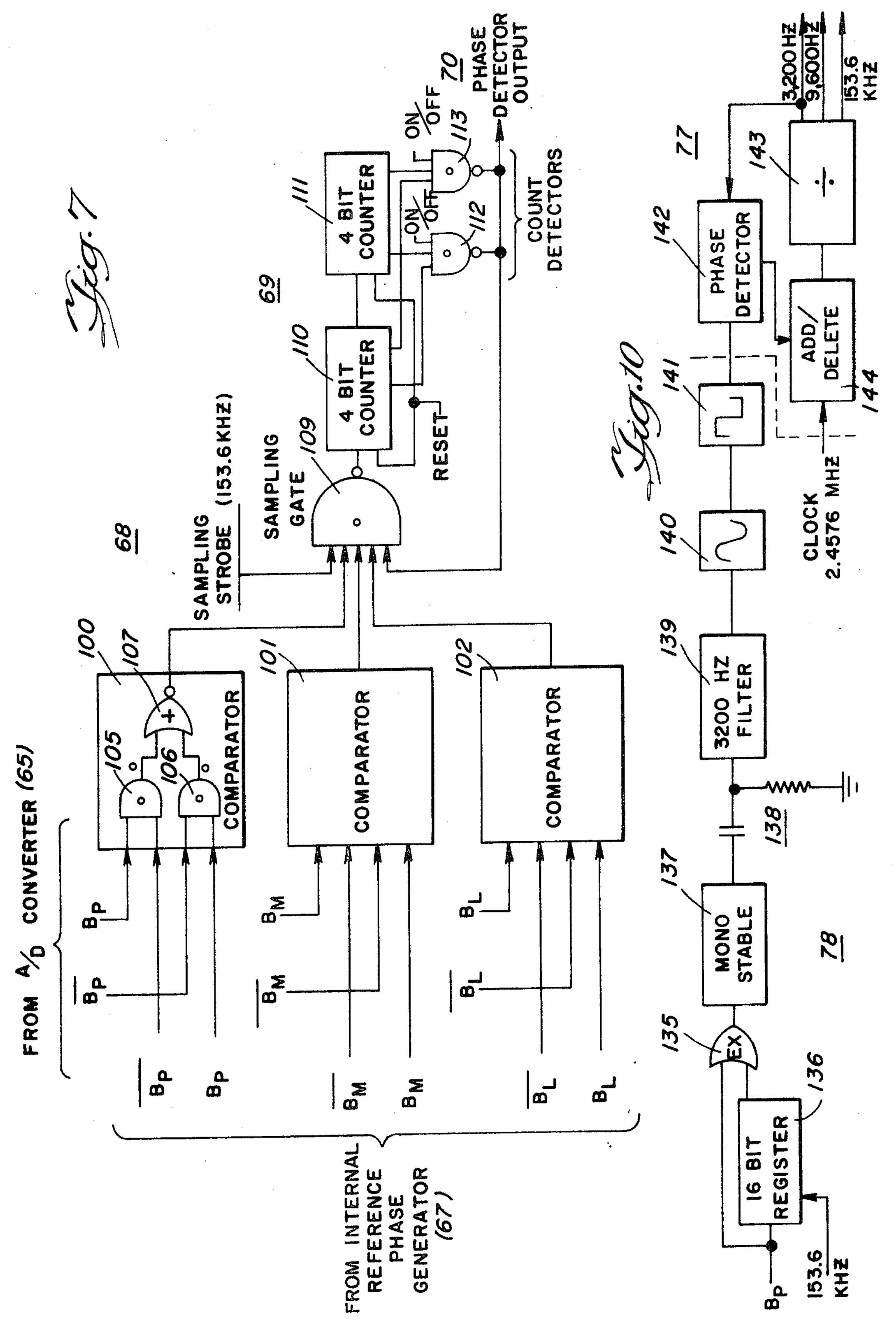
FIG. 7 is a block diagram of the received signal phase detector.
FIG. 10 is a block diagram of the phase shift occurrence detector for the timing signal generator and a portion of the generator.

FIG. 7 illustrates one of the 16 phase comparators 68, FIG. 2. Each phase comparator has three comparator sections, 100 for the polarity bit ($B_P$), 101 for the most significant amplitude bit ($B_M$) and 102 for the least significant amplitude bit ($B_L$). The three comparator sections are identical and only one is shown and described in detail.

Polarity bit comparator section 100 has two AND gates 105 and 106. The inputs to 105 are $B_P$ from the A/D converter 65 and $\overline{B_P}$ from the IRPG 67. The inputs to AND gate 106 are $\overline{B_P}$ from the A/D converter 65 and $B_P$ from IRPG 67. When the inputs to the AND gates do not match (indicating correspondence of the received signal polarity bit and the reference), the AND gates have 0 outputs. These outputs are connected with OR gate 107, the output of which is inverted to provide a 1 at the output of comparator 100. The outputs of the three comparators are connected with inputs of AND gate 109 where they are combined with a timing signal or sampling strobe (a narrow pulse) at 153.6 KHz. The phase correspondence output of sampling AND gate 109 (which occurs only with correspondence of all three bits) is connected with two serially connected 4 bit counters 110, 111. With each phase correspondence which is detected, counter 110 is advanced one count. After 16 counts (1111) counter 111 is advanced one count and counter 110 starts over. A pair of count detector AND gates 112, 113 are shown, corresponding with majority detector, 70, FIG. 2. AND gates 112 and 113 may be connected with different sections of 4 bit counters 110, 111 to respond to different total counts. The appropriate AND gate 112, 113 is selected by an on-off signal applied to an input of each of the gates. When the desired count is achieved, a signal is developed at the phase detector output (here a negative going signal to 0) and at the same time AND gate 109 is disabled to prevent further counting.

When the system operating at 9,600 bits per second, two cycles of the received signal are available for detecting phase. This affords a maximum of 32 comparisons. A count of 17 matches is usually sufficient for accurate demodulation. If a data rate of 4,800 is used, five cycles of received signal are available. This allows up to 80 comparisons. A count of 32 may be used.

Figure 8:
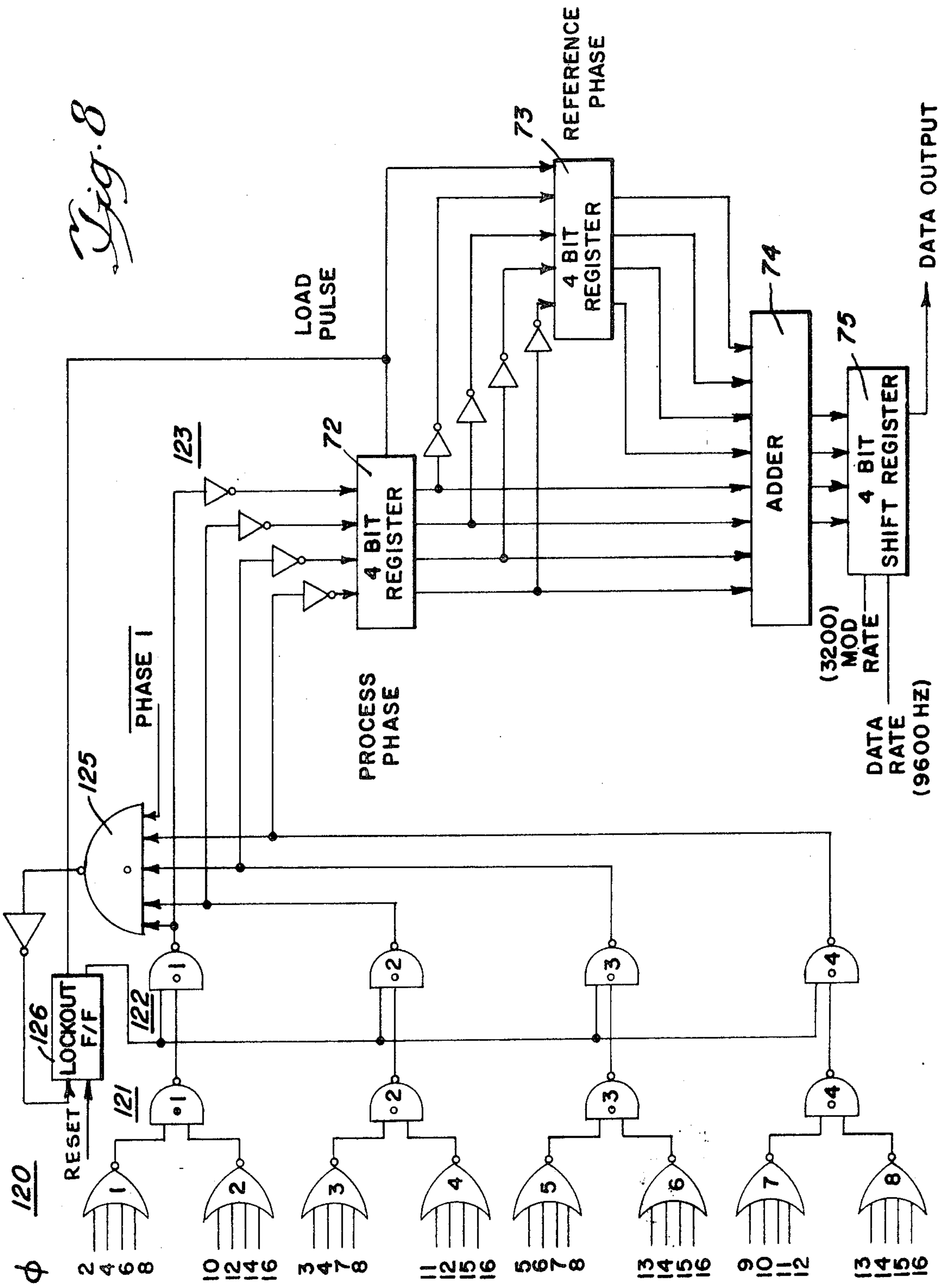
FIG. 8 is a block diagram of the output data generator.

The detected phase (one of 16) is identified by a 4 bit digital word. This digital word is generated by a matrix illustrated in FIG. 8. Eight OR gates 120-1. . . 120-8 have inputs corresponding with the various possible detected phases, 2 through 16. (Phase 1 is represented by 0000 and is handled in a different manner.) The outputs of the OR gates are negated and combined in negated AND gates 121-1...121-4. Through this digital circuit a unique four digit word is developed, representing each of the phases which may be selected. These four digits are connected through negated AND gates 122-1...122-4 and inverters 123 with 4 bit process phase register 72.

The circuit is controlled so that only one phase representing digital word may be generated for each three cycle sequence of the received signal. Upon occurrence of an output from one of the phase detectors, an output occurs at one of gates 122-1...122-4 (except for phase 1). This signal provides an input for negated AND gate 125 connected with a lockout flip-flop 126 which, when actuated, prevents further actuation of AND gates 122-1...122-4. If phase 1 is detected, the phase 1 input to gate 125 is removed and lockout flip-flop 126 is actuated. An output is derived from lockout flip-flop 126 which provides a load pulse to the process phase and reference phase registers 72 and 73. Flip-flop 126 is reset at the start of a detector operation.

The phase representing digital word in register 72 is summed by adder (digital phase comparator) 74 with the signal (inverted) representing the previous phase in reference phase register 73. The output data is generated directly, taking advantage of the fact that the system operates on the basis of only odd numbered phase shifts. That is, the modulated signal will be shifted by (N/16) cycle, where N = 1, 3, 5...15. Therefore, the add operation of adder 74 generates the 3 bit data set directly in the 3 most significant bits of the sum. The following is an example. Suppose that the last modulation cycle consisted of phase 3. It would have been decoded as 0010, MSB to the left. Inverted and held in the reference phase register, it appears as 1101. Now suppose the transmitter sends a 3 bit data set of 100. It will send a signal shifted by (9/16) cycle. This will be detected as phase 12, decoded as 1011 and placed in the process phase register.

Adding 1011
and 1101
the sum is |100|0

The output of adder 74 is connected with a 4-bit shift register 75 from which it is delivered as output data at the rate of 9,600 Hz. The register is reloaded at the MOD RATE, 3,200 Hz, eliminating the fourth digit.

Figure 9:
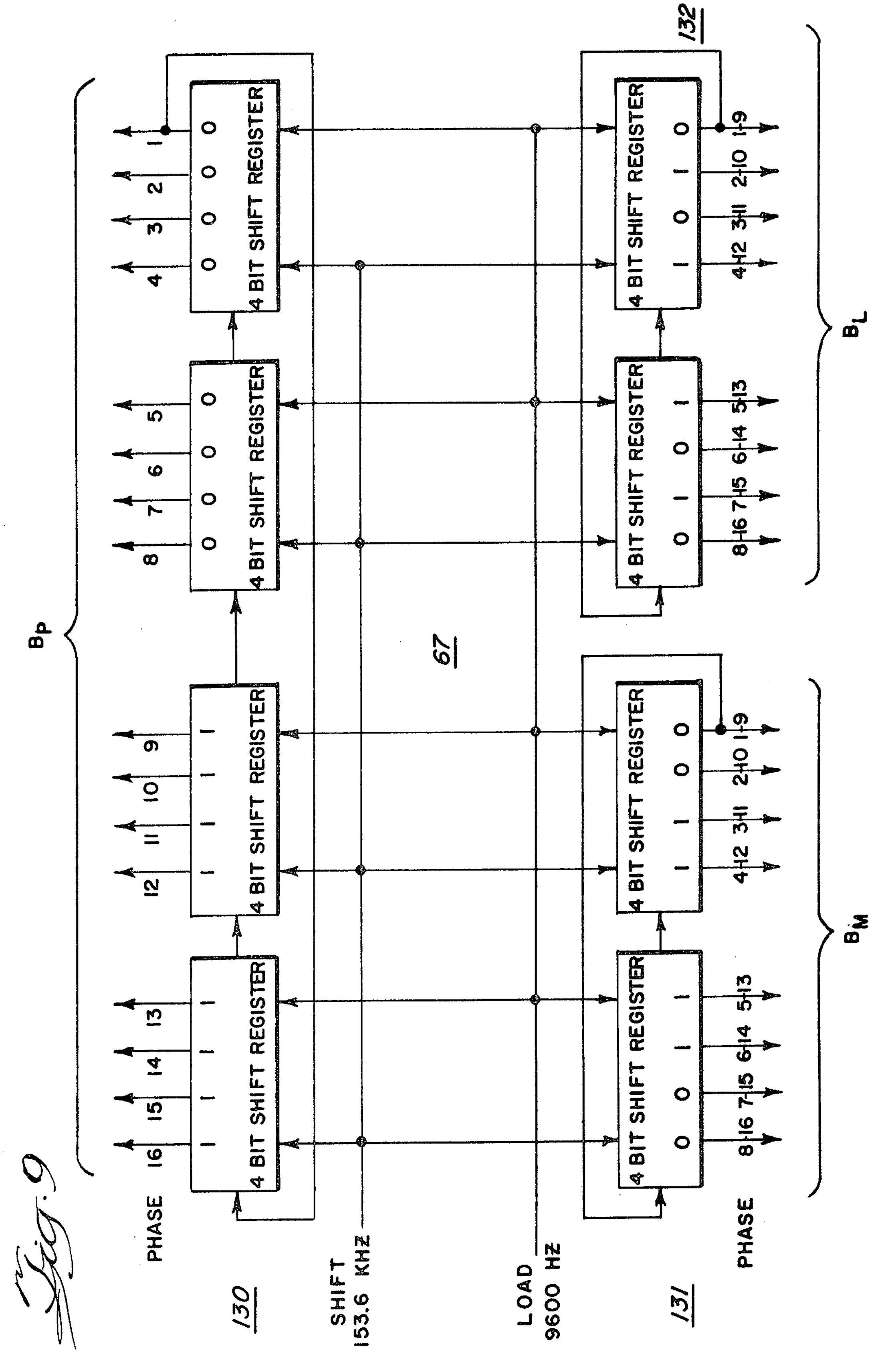
FIG. 9 is a block diagram of the reference phase generator utilized with the phase detector.

Internal reference phase generator 67 is illustrated in FIG. 9. A 16 bit shift register 130 (here shown in four 4-bit serially connected sections) provides the polarity bit $B_P$. Eight-bit register 131 provides the amplitude bit $B_M$ while 8-bit shift register 132 provides the amplitude bit $B_L$. Only 8-bit registers are needed for the amplitude bits as the amplitude relationships repeat each half cycle. The outputs are identified by the channel designations of the detector.

The digital indications for each of the outputs of the registers 130, 131, 132 represent the condition for reference phase 1 (0°–22.5°). This condition is loaded into the shift registers at a 9,600 Hz rate. The digital information is then shifted through the registers at the 16th harmonic thereof, 153.6 KHz, corresponding with the rate of digital analysis of the received phase modulated sine wave in the analog-to-digital converter 65.

As an example, considering the condition of the registers shown in FIG. 9 at the start of one cycle of the 9,600 Hz signal, the polarity bit $B_P$ for detector channel 1 is 0 and amplitude bits $B_M$ and $B_L$ are 0 (the same amplitude bits are connected with detector channel 9). With each shift signal at 153.6 KHz the digits move to the right through the respective registers.

Phase shift detector 78 associated with the timing signal generator is illustrated in FIG. 10. Polarity bit $B_P$ (a 9,600 Hz square wave phase shifted with each three-cycle segment of the received signal) is coupled from A/D converter 65, FIG. 2, with both an exclusive OR circuit 135 and a 16 bit shift register 136, through which it is shifted at 153.6 KHz. This circuit detects the occurrence of a phase shift in the received signal, indicating the start of a three-cycle segment of the transmitted signal. If there is no phase shift, the output of register 136 occurs at the same time as the following polarity bit and the exclusive OR circuit 135 has no output. When a phase shift takes place, input polarity bit $B_P$ will occur before the preceding polarity bit has passed through register 136. The resulting output of gate 135 triggers monostable multivibrator circuit 137, the output of which is differentiated at 138. The differentiated pulse is connected through filter 139 with a resonant circuit 140 which rings, generating a sine wave which is squared by a clipper circuit 141. The resulting square wave, in phase synchronism with the transmitted modulation rate of the received signal, is connected with phase detector 142 where it is compared with the 3,200 Hz output of timing divider 143. The output of phase detector 142 causes a phase correction circuit 144 to add pulses to or delete pulses from the 2.4576 MHz clock frequency which provides the basic signal for timing signal generator 77. Thus, the various timing signals are maintained in proper time relation with the phase change of the received signal.

Figure 11:
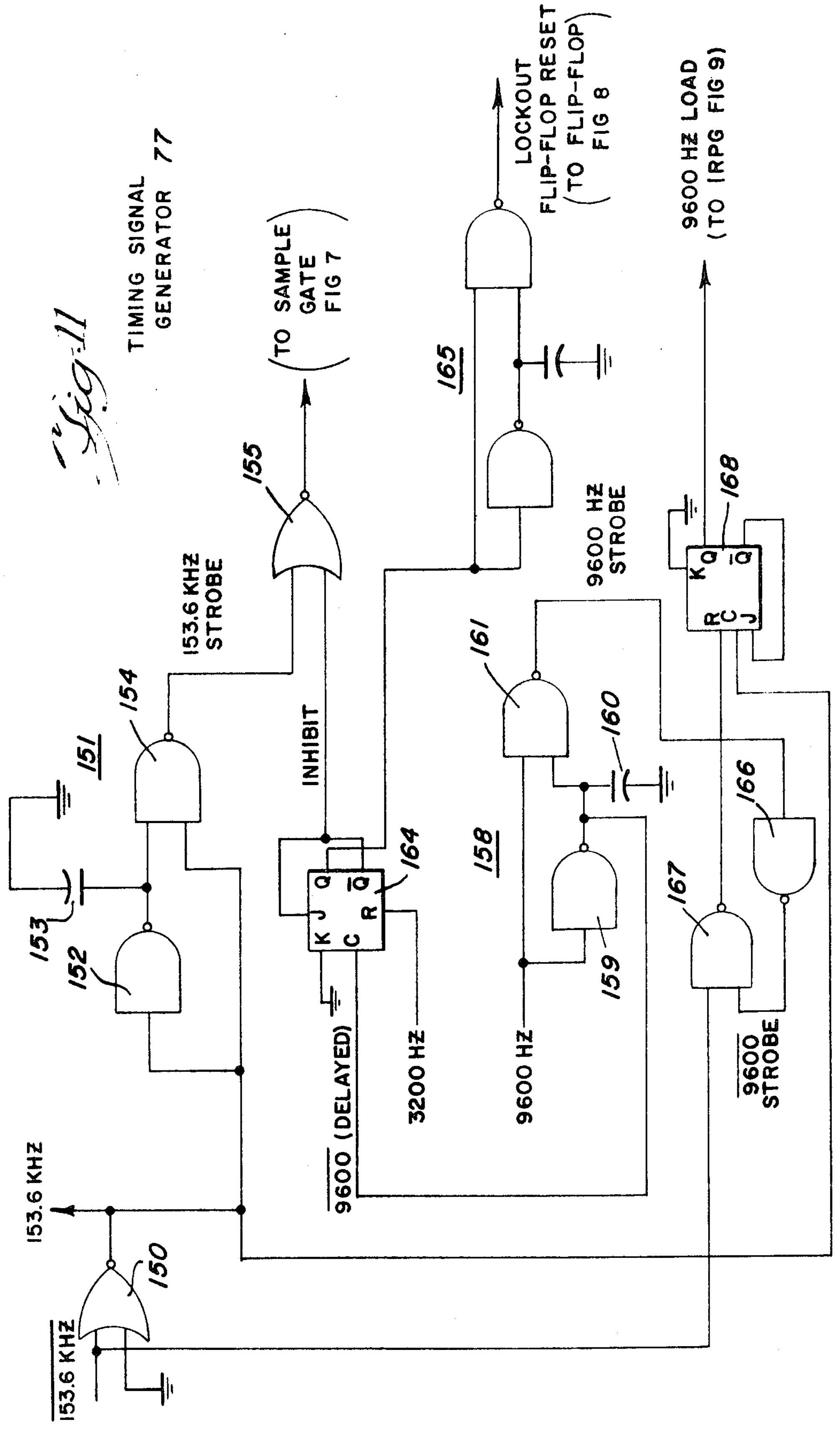
FIG. 11 is a block diagram of another portion of the timing signal generator.

Some of the outputs of divider 143 are utilized to provide various control signals in addition to the three basic frequencies of 153.6 KHz, 9,600 Hz and 3,200 Hz. The portion of the timing signal generating circuit shown in FIG. 11 has three inputs, $\overline{153.6\ KHz}$, 9,600 Hz and 3,200 Hz. The $\overline{153.6\ KHz}$ is connected with a NOR gate 150 which serves as an inverter, providing a 153.6 KHz signal for use in other portions of the receiver.

A 153.6 KHz strobe generating circuit 151 includes NAND gate 152 with a 153.6 KHz input having a delay capacitor 153 connected with the output. The delayed negated signal is connected as an input to NAND gate 154, along with 153.6 KHz. The output is a pulse at the 153.6 KHz frequency. This signal is connected with a NOR gate 155 to provide the 153.6 KHz strobe signal for sample gate 109 (and the sample gates of the other 15 phase comparators 68) except during the inhibit period at the start of the 3 cycle transmitted signal. The generation of the inhibit signal input for gate 155 will be described below.

The 9,600 Hz signal is connected with a strobe generator 158 including inverter 159 with a delay capacitor 160 connected to the output and a NAND gate 161 for combining the 9,600 and the delayed inverted 9,600 signals.

The delayed $\overline{9,600\ Hz}$ signal is utilized as a clock for JK flip-flop 164. The flip-flop is reset by the 3,200 Hz signal and upon reset provides an output at $\overline{Q}$ which lasts for one 9,600 Hz cycle to block the 153.6 KHz strobe signal to the sample gates. At the end of the one cycle inhibit, flip-flop 164 is set and gate 155 opens passing the 153.6 KHz strobe signal to the sample gates. The Q output of flip-flop 164 is connected through a strobe signal generator 165 to provide a reset signal for lockout flip-flop 126 and shift the process and reference phase registers 72 and 73, FIG. 8.

The 9,600 Hz strobe signal from gate 161 is inverted by NAND gate 166 and combined in NAND gate 167 with $\overline{153.6\ KHz}$. The output is connected with the reset input of JK flip-flop 168. Flip-flop 168 is clocked with the 153.6 KHz signal. An output from Q provides a signal at 9,600 Hz to the LOAD input of the internal reference phase generator 67, FIG. 9.

The accuracy of demodulation of the phase shifted signal is dependent on maintenance of a constant frequency at the output of mixer 62, and thus requires control of local oscillator 63. This is provided by digital frequency comparator 79, illustrated in FIG. 12.

The polarity bit $B_P$, a square wave having a frequency of 9,600 Hz, is connected with a differentiator circuit including series capacitor 175 and shunt resistor 176. The output of the differentiator is a series of positive and negative pulses representing the leading edge of each half of cycle of the 9,600 Hz square wave.

The network 177 adds the differentiated $B_P$ signal to its inverse and has an output which is a series of unidirectional pulses at 19,200 Hz, $2B_P$. The circuit includes an OR gate 178 having two inputs, one derived from the differentiator through inverter 179 and the other derived from the differentiator through a pair of serially connected inverters 180, 181. The signals at the inputs and outputs of the OR gate 178 are indicated on the diagram.

The series of positive pulses at 19.2 KHz is compared with the square wave at 153.6 KHz from timing circuit 77. With proper frequency relations, the $B_P$ pulses coincide with the falling edge of the 153.6 KHz signal.

The frequency control circuit has two channels 185 and 186. The former is operative when the $B_P$ pulse occurs within one-half cycle (at 153.6 KHz) before the change of state and the latter is operative when the pulse occurs within one-half cycle after the change of state.

Figures 12, 13:
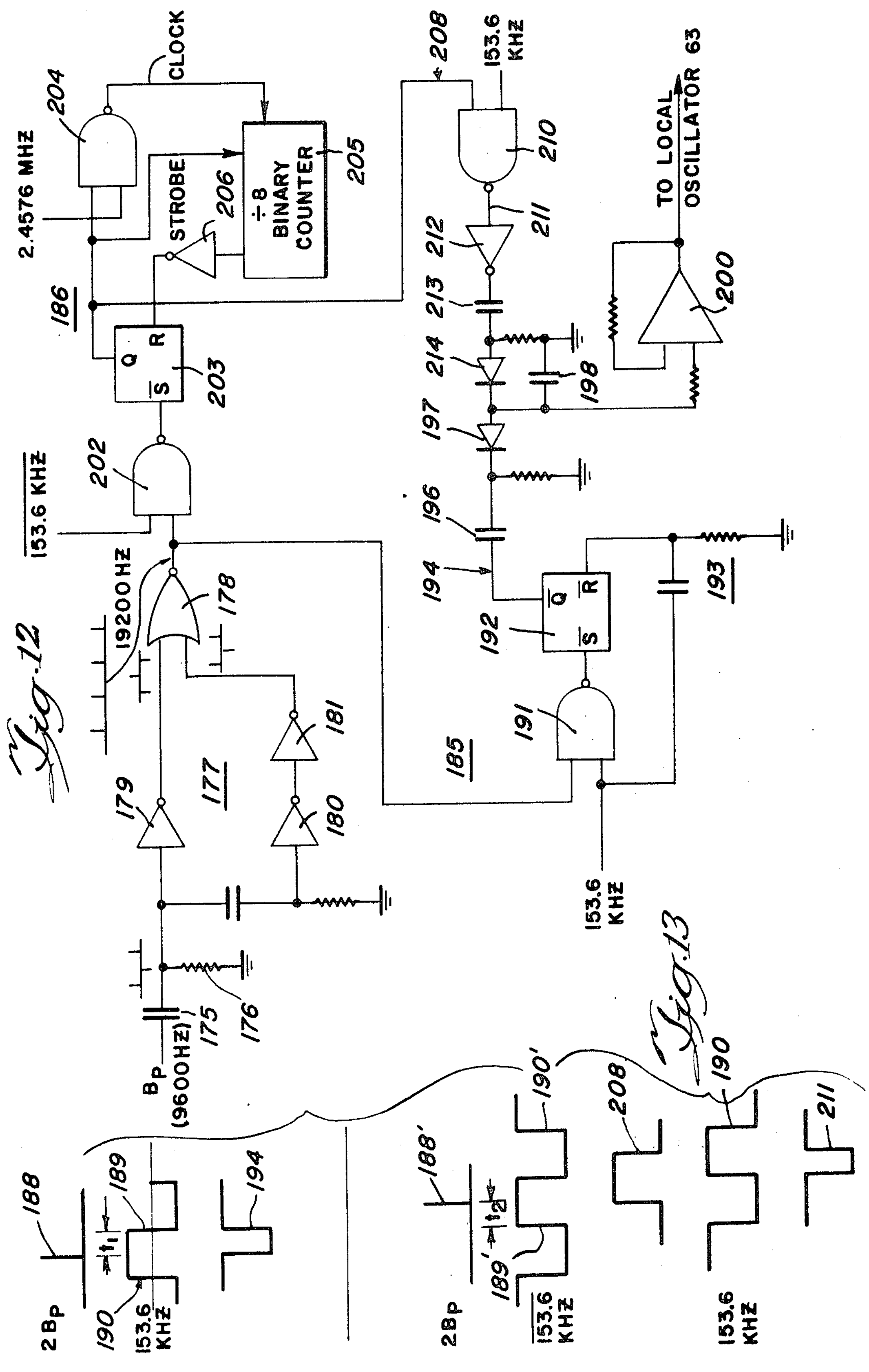
FIG. 12 is a block diagram of the automatic frequency control.
FIG. 13 is a series of waveforms utilized in explaining the operation of the automatic frequency control.

Consider first channel 185 and the three waveforms at the top of FIG. 13, which illustrate the time relationships. The $2B_P$ pulse 188 occurs a time $t_1$ ahead of the change of state indicated by the falling edge 189 of a half cycle of the 153.6 KHz signal 190. The simultaneous occurrence of a positive pulse 188 and a positive half cycle of 153.6 KHz actuates NAND gate 191 providing an output to the $\overline{S}$ input of JK flip-flop 192. This causes the $\overline{Q}$ output to go negative. JK flip-flop 192 is reset by the falling edge 189 of the 153.6 KHz signal which is coupled through a differentiator circuit 193 with the $\overline{R}$ input. The resulting pulse at $\overline{Q}$ is illustrated at 194, FIG. 13, and is a negative pulse having a width equal to the time $t_1$ by which the $2B_P$ pulse precedes the change of state of the 153.6 KHz signal. The pulses 194 recur at 19.2 KHz and are coupled through capacitor 196 and diode 197 to provide a negative voltage to an integrating capacitor 198. The voltage across capacitor 198 is connected with an input of amplifier 200, the output of which provides a frequency control signal for local oscillator 63.

Where $2B_P$ pulses occur later than the desired change of state of the 153.6 KHz signal, channel 186 is operative. The five waveforms in the lower portion of FIG. 13 illustrate the operation of this circuit. The $2B_P$ pulse 188′ coincides with a positive going half cycle of 153.6 KHz, 190′, and lags by a time $t_2$ the positive going edge 189′ which corresponds with the negative going edge 189 of the 153.6 KHz signal. Signals 188′ and 190′ provide inputs for NAND gate 202 and the negative output pulse therefrom is connected with the $\overline{S}$ input of JK flip-flop 203, setting the flip-flop.

A positive flip-flop output at Q is connected with one input of NAND gate 204, the other input of which is a 2.4576 MHz signal. The output of NAND gate 204 is utilized as a clock input to ÷8 binary counter 205. The Q output of flip-flop 203 also provides a strobe input to the counter. At the end of an 8 count, a time corresponding with one-half cycle of 153.6 KHz, the output of counter 205 is connected through inverter 206 with the $\overline{R}$ input of flip-flop 203, resetting it and terminating the Q output. Thus, the signal at Q has a time duration equal to one-half cycle of 153.6 KHz starting with the occurrence of $2B_P$ pulse 188′. This signal is illustrated at 208.

NAND gate 210 has as inputs the Q signal from flip-flop 203 and 153.6 KHz wave 190 (repeated in the lower portion of FIG. 13 for convenience). When positive signals coincide at the input of gate 210, a negative output signal 211 occurs. This signal has a time duration from the leading edge of a positive half-cycle of 153.6 KHz to the trailing edge of Q output 208 of flip-flop 203. This is identical with time $t_2$, but is offset therefrom by one-half cycle of the 153.6 KHz signal. The negative pulses 211 occur at the $2B_P$ rate. They are connected through inverter 212, coupling capacitor 213 and diode 214 with integrator capacitor 198 and amplifier 200, providing a positive control signal for the local oscillator.

We claim:

1. In a receiver for a carrier signal phase modulated with digital data, a demodulator comprising:
- a source of phase modulated received signal;
- means responsive to the polarity of the received signal for generating a digital signal representing polarity;
- means responsive to the instantaneous amplitude of the received signal for generating a digital signal representing amplitude;
- a source of digital polarity and amplitude reference signals representing different phases corresponding with the possible phases of said received signal;
- means for comparing the digital polarity and amplitude signals representing the received signal with each of the reference signals; and
- means responsive to said comparing means for determining the phase of the received signal.

2. The demodulator of claim 1 including means for dividing each cycle of the received signal into plural portions, means for providing phase reference signals in corresponding plural portions, means for comparing each of the portions of the received and reference signals, and means responsive to a plurality of matches between the received signal and one of the reference signals for determining the phase of the received signal.

3. The demodulator of claim 2 including means for comparing each of the portions of the received and reference signals for both polarity and amplitude.

4. The demodulator of claim 2 including means for counting the matches between the received signal and each of the reference signals and means responsive to a predetermined count for determining the phase of the received signal.

5. The demodulator of claim 1 including means for comparing succeeding phases of the received signal to determine the difference therebetween, and means responsive to the phase difference for generating a signal representing the modulation of the received signal.

6. The demodulator of claim 1 including means responsive to the phase determining means for generating a digital representation of the phase of the received signal, means for comparing successive digital phase representations to generate a series of digital data representing demodulations of the received signal.

7. The demodulator of claim 6 in which the means for comparing successive digital phase representations includes a summing means.

8. The receiver of claim 1 for a carrier signal having successive multiple cycle segments of fixed phase, the relative phase of successive segments representing modulating data, including
- means for detecting a shift in phase between successive segments of the received signal, and
- means for inhibiting operation of the phase comparing means for a portion of the segment received following detection of a phase shift.

9. The demodulator of claim 1 in which the means for generating a digital signal representing instantaneous amplitudes of the received signal includes a peak detector responsive to the amplitude of the received signal, means connected with the peak detector for establishing an amplitude reference which is a function of the peak amplitude of the received signal and means for comparing the instantaneous amplitude of the received signal with said amplitude reference.

10. The demodulator of claim 9 in which the amplitude comparing means includes a voltage divider connected with said amplitude reference establishing means, a plurality of amplitude comparators for comparing the instantaneous amplitude of the received signal with each of a plurality of references at different amplitude levels, from said voltage divider, and means responsive to the outputs of said comparators for generating a digital representation of the instantaneous amplitude of the received signal.

11. The converter of claim 10 in which each of said plural comparators includes two sections, one having a positive reference signal and the other a negative reference signal.

12. In a heterodyne receiver for a differential phase shifted signal having any one of $n$ discrete phases, having a local heterodyne oscillator with an automatic frequency control, a frequency comparator circuit, comprising:
- a source of signals representing each polarity change of said received phase shifted signal;

a source of reference signal at a frequency which is a harmonic at least 2*n* times the frequency of the received signal;

means for comparing the phase of said polarity change representing signals and said reference signal; and means responsive to said phase comparator for controlling the phase of said local oscillator.

13. The receiver of claim 12 including means for deriving from said received signal a series of pulses corresponding with polarity changes of said received signal and wherein said reference signal is a square wave, said phase comparing means having means for comparing the time of occurrence of the pulses with the shift of condition of said square wave.

14. The receiver of claim 13 wherein said means for comparing the time of occurrence of the pulses with the shift of condition of the square wave includes a gate circuit opened by one of the signals and closed by the other, a source of pulses at a frequency higher than said reference frequency connected with said gate circuit and means for utilizing the pulses passed by said gate to provide a control signal for said local oscillator.

15. The receiver of claim 12 in which said phase comparing means has two paths, one operative when the phase of the received signal leads the phase of the reference and the other operative when the phase of the received signal lags the phase of the reference.

16. The receiver of claim 15 including means connected with said one path for counting said pulses occurring between the time of said phase shift and the polarity change of said reference and utilizing said count to provide a control signal for the local oscillator, and means connected with said second path for counting the pulses which occur between said phase shift and the end of a reference cycle and for subtracting the count from the total count for the reference signal to provide a control signal for the local oscillator.

17. In a digital data transmitter having a source of serial digital data bits and a source of carrier signal, phase modulation means, including:

means for deriving from said source of carrier signal a plurality of signals at different phases;

means responsive to a *b*-bit data group for selecting a signal phase to be transmitted;

means for converting the serial digital data bits into successive *b*-bit groups; and means including a *b*-bit adder for summing each data group from said converting means with the data group which determined the selection of the previous transmitted signal phase, the sum being connected with said selecting means to determine the next signal phase to be transmitted.

18. The digital data transmitter of claim 17, including a *b*-bit phase control storage register having an input connected with the output of said *b*-bit adder, said *b*-bit phase control storage register having a first output connected with said means for selecting the signal phase to be transmitted and a second output, and a *b*-bit adder storage register having an input connected with the second output of said *b*-bit phase control storage register and an output connected with said *b*-bit adder.

19. In a receiver for a signal having successive signal portions of differing phases, each signal portion having any one of *n* discrete phase positions, a circuit for generating timing signals in a predetermined phase relation with each successive portion of the received signal, comprising:

a source of timing reference signal at a frequency which is a harmonic of the product of *n* times the frequency of the phase shifted received signal;

a frequency divider responsive to said timing reference signal, having the timing signals as an output;

means for detecting a shift in phase between successive portions of the received signal;

means for modifying the timing reference signal to said frequency divider to shift the phase of said timing signals; and means responsive to the detection of a shift in phase of said received signal to actuate said modifying means to establish said predetermined phase relation between the timing signals and each successive portion of said received signal.

20. The timing signal generating circuit of claim 19 including:

means responsive to detection of a received signal phase shift for generating a signal in phase synchronism with the received signal;

means for comparing a timing signal with the signal in synchronism with the received signal; and means responsive to detection of a phase difference between the timing signal and the signal in synchronism with the received signal for operating said actuating means.

* * * * *